United States Patent
Taylor et al.

(10) Patent No.: US 8,671,229 B1
(45) Date of Patent: Mar. 11, 2014

(54) SYSTEM AND METHOD FOR MANAGING IO OPERATIONS

(75) Inventors: Alan L. Taylor, Cary, NC (US); Miles A. de Forest, Bahama, NC (US); Michael D. Haynes, Raleigh, NC (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/539,435

(22) Filed: Jun. 30, 2012

(51) Int. Cl.
*G06F 13/38* (2006.01)

(52) U.S. Cl.
USPC .............................................. 710/29; 710/36

(58) Field of Classification Search
None
See application file for complete search history.

(56) References Cited

U.S. PATENT DOCUMENTS

| | | | | |
|---|---|---|---|---|
| 4,376,982 A | * | 3/1983 | Bantz et al. | 710/105 |
| 6,052,772 A | * | 4/2000 | Kark et al. | 712/38 |
| 6,760,808 B2 | * | 7/2004 | Peters et al. | 711/114 |
| 7,827,331 B2 | * | 11/2010 | Baba et al. | 710/72 |
| 7,934,059 B2 | * | 4/2011 | Papazova et al. | 711/141 |
| 8,255,617 B2 | * | 8/2012 | Goss et al. | 711/103 |
| 8,458,425 B2 | * | 6/2013 | Tamura et al. | 711/166 |
| 2012/0221533 A1 | * | 8/2012 | Burness et al. | 707/690 |

* cited by examiner

*Primary Examiner* — Cheng-Yuan Tseng
(74) *Attorney, Agent, or Firm* — Brian J. Colandreo; Mark H. Whittenberger; Holland & Knight LLP

(57) ABSTRACT

A method, computer program product, and computing system for receiving an IO request from a host concerning an IO operation to be performed on a data array. The IO request is processed to generate an IO descriptor. The IO descriptor defines a unique and proprietary memory space for each of a plurality of IO processing routines.

12 Claims, 3 Drawing Sheets

SYSTEM AND METHOD FOR MANAGING IO OPERATIONS

TECHNICAL FIELD

This disclosure relates to IO operations within a data array and, more particularly, to the cancellation of IO operations within a data array.

BACKGROUND

Storing and safeguarding electronic content is of paramount importance in modern business. Accordingly, various systems may be employed to protect such electronic content. In order to maintain such electronic content, systems and methods must be employed to ensure the integrity of such electronic content. To maintain such content integrity, rigid IO operations are typically performed. Unfortunately, such rigid IO operations may result in complicated procedures and inefficient operation.

SUMMARY OF DISCLOSURE

In a first implementation, a computer-implemented method includes receiving an IO request from a host concerning an IO operation to be performed on a data array. The IO request is processed to generate an IO descriptor. The IO descriptor defines a unique and proprietary memory space for each of a plurality of IO processing routines.

One or more of the following features may be included. A cancellation request may be received from the host concerning the IO request. The cancellation request may be broadcast to each of the plurality of IO processing routines. A status report may be received from each of the plurality of IO processing routines, wherein each status report identifies whether or not each of the IO processing routines processed the IO request. The unique and proprietary memory space may be released for each of the plurality of IO processing routines. The IO operation may be chosen from the group consisting of: a data read operation; and a data write operation. The IO processing routines may include one or more of: a compression/decompression IO processing routine; a deduplication IO processing routine; and a zero detection IO processing routine.

In another implementation, a computer program product resides on a computer readable medium that has a plurality of instructions stored on it. When executed by a processor, the instructions cause the processor to perform operations including receiving an IO request from a host concerning an IO operation to be performed on a data array. The IO request is processed to generate an IO descriptor. The IO descriptor defines a unique and proprietary memory space for each of a plurality of IO processing routines.

One or more of the following features may be included. A cancellation request may be received from the host concerning the IO request. The cancellation request may be broadcast to each of the plurality of IO processing routines. A status report may be received from each of the plurality of IO processing routines, wherein each status report identifies whether or not each of the IO processing routines processed the IO request. The unique and proprietary memory space may be released for each of the plurality of IO processing routines. The IO operation may be chosen from the group consisting of: a data read operation; and a data write operation. The IO processing routines may include one or more of: a compression/decompression IO processing routine; a deduplication IO processing routine; and a zero detection IO processing routine.

In another implementation, a computing system includes at least one processor and at least one memory architecture coupled with the at least one processor, wherein the computing system is configured to perform operations including receiving an IO request from a host concerning an IO operation to be performed on a data array. The IO request is processed to generate an IO descriptor. The IO descriptor defines a unique and proprietary memory space for each of a plurality of IO processing routines.

One or more of the following features may be included. A cancellation request may be received from the host concerning the IO request. The cancellation request may be broadcast to each of the plurality of IO processing routines. A status report may be received from each of the plurality of IO processing routines, wherein each status report identifies whether or not each of the IO processing routines processed the IO request. The unique and proprietary memory space may be released for each of the plurality of IO processing routines. The IO operation may be chosen from the group consisting of: a data read operation; and a data write operation. The IO processing routines may include one or more of: a compression/decompression IO processing routine; a deduplication IO processing routine; and a zero detection IO processing routine.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview

Figure 1:
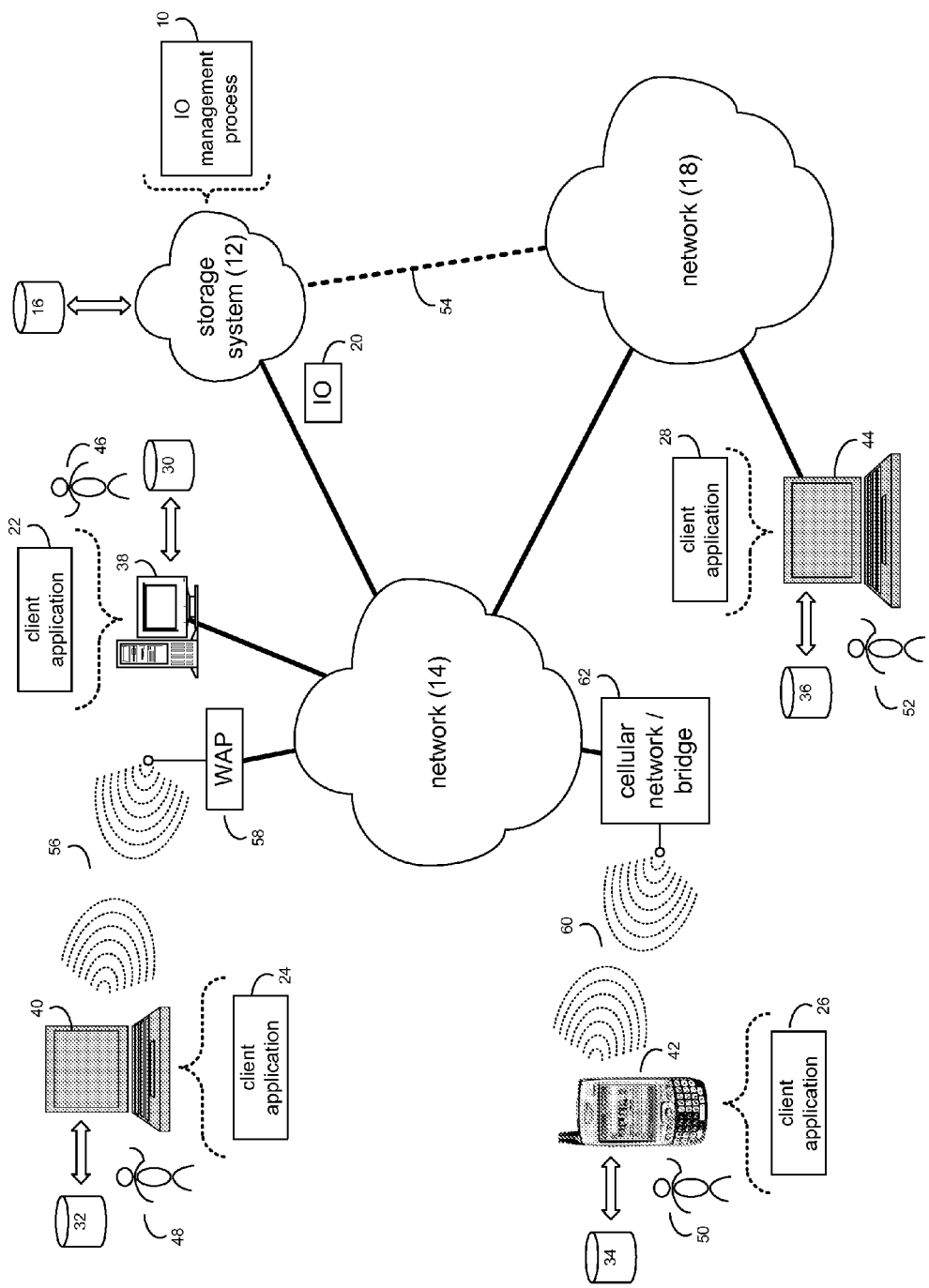
FIG. 1 is a diagrammatic view of a storage system and a IO management process coupled to a distributed computing network.

Referring to FIG. 1, there is shown IO management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows XP Server™; Novell Netware™; Redhat Linux™ Unix, or a custom operating system, for example.

The instruction sets and subroutines of IO management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to IO write requests (i.e. a request that content be written to storage system 12) and IO read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Client electronic devices 38, 40, 42, 44 may each execute an operating system, examples of which may include but are not limited to Microsoft Windows™, Microsoft Windows CE™, Redhat Linux™, or a custom operating system.

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

For the following discussion, client application 22 is going to be described for illustrative purposes. However, this is not intended to be a limitation of this disclosure, as other client applications (e.g., client applications 24, 26, 28) may be equally utilized.

For illustrative purposes, storage system 12 will be described as being a network-based storage system that includes a plurality of rotating, electro-mechanical backend storage devices. However, this is for illustrative purposes only and is not intended to be a limitation of this disclosure, as other configurations are possible and are considered to be within the scope of this disclosure. For example and as discussed above, storage system 12 may be a personal computer that includes a single electro-mechanical storage device.

Figure 2:
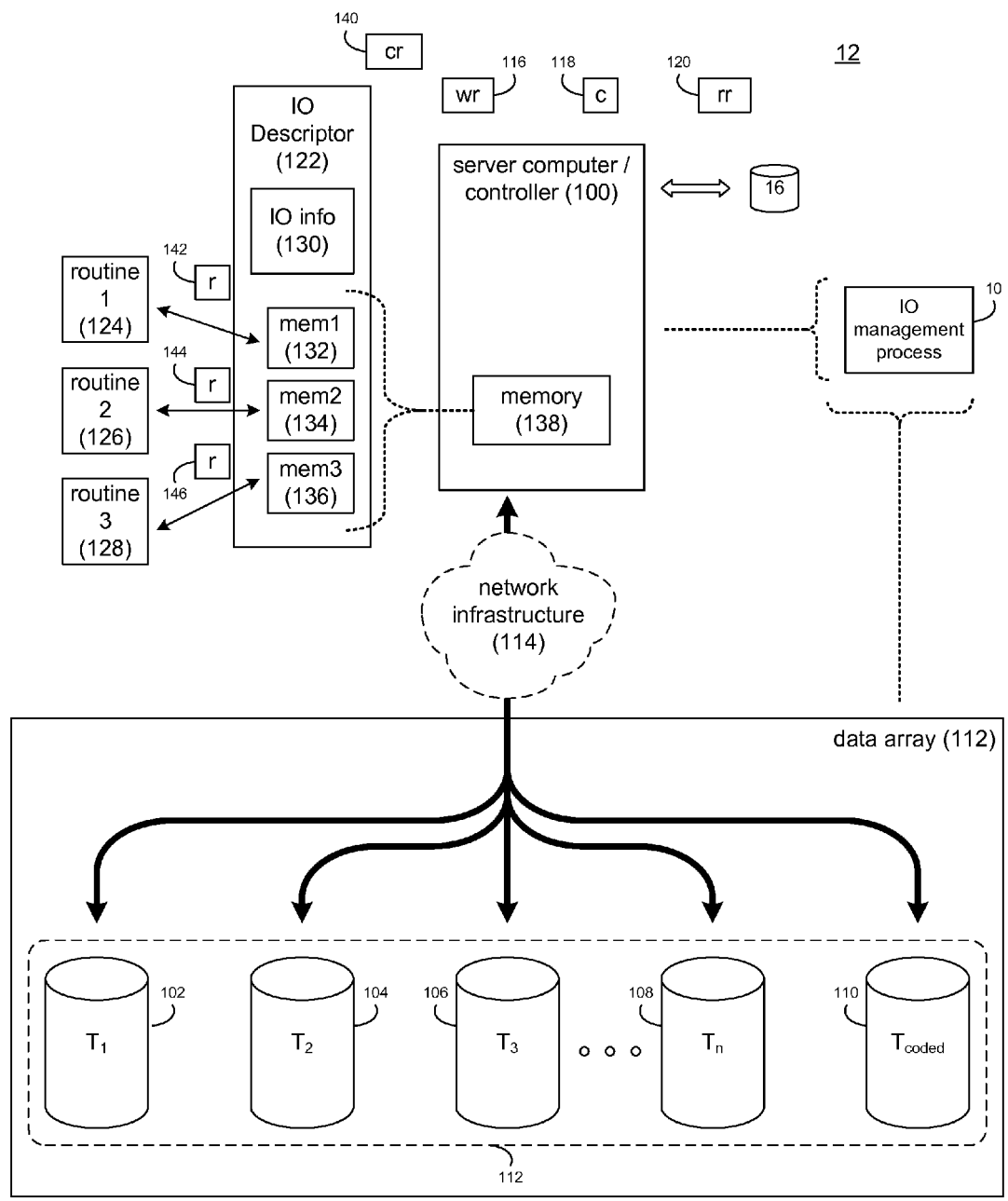
FIG. 2 is a diagrammatic view of the storage system of FIG. 1.
Figure 3:
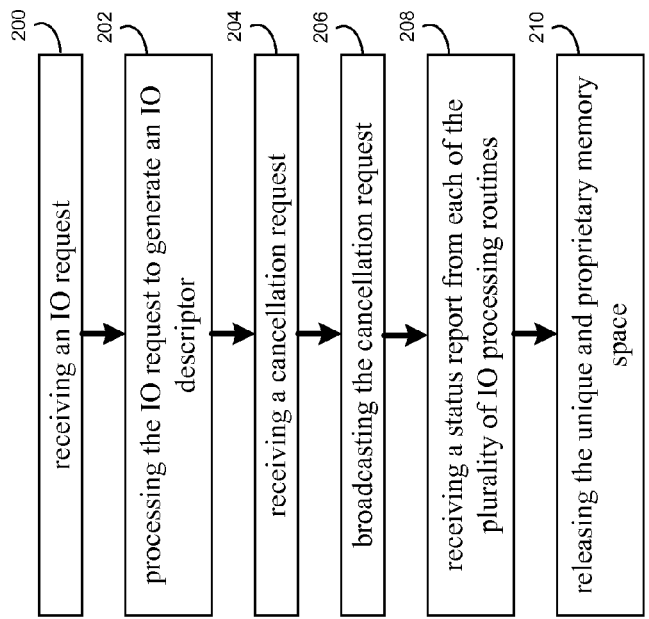
FIG. 3 is a flow chart of the IO management process of FIG. 1.

Referring also to FIG. 2, storage system 12 may include a server computer/controller (e.g. server computer/controller 100) and a plurality of storage targets $T_{1-n}$ (e.g. storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for illustrative purposes only and is not intended to be a limitation of this disclosure, as other configurations are possible. For example, storage targets 102, 104, 106, 108 may be configured in a non-RAID fashion or as a RAID 3, RAID 4, RAID 5 or RAID 6 array.

While in this particular example, storage system 12 is shown to include four storage targets (e.g. storage targets 102, 104, 106, 108), this is for illustrative purposes only and is not intended to be a limitation of this disclosure. Specifically, the actual number of storage targets may be increased or decreased depending upon e.g. the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for illustrative purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more rotational, electro-mechanical hard disk drives, wherein a combination of storage targets 102, 104, 106, 108 and coded target 110 may form data array 112. Examples of the rotational, electro-mechanical hard disk drives may include but are not limited to SATA drives, SCSI drives, SAS drives, IDE drives, and EIDE drives.

The manner in which storage system 12 is implemented may vary depending upon e.g. the level of redundancy/performance/capacity required. For example, storage system 12 may be a RAID device in which server computer/controller 100 is a RAID controller card and storage targets 102, 104, 106, 108 and/or coded target 110 are individual "hot-swappable" hard disk drives. An example of such a RAID device may include but is not limited to an NAS device. Alternatively, storage system 12 may be configured as a SAN, in which server computer/controller 100 may be e.g., a server computer and each of storage targets 102, 104, 106, 108 and/or coded target 110 may be a RAID device and/or computer-based hard disk drive. Further still, one or more of storage targets 102, 104, 106, 108 and/or coded target 110 may be a SAN.

In the event that storage system 12 is configured as a SAN, the various components of storage system 12 (e.g. server computer/controller 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of IO management process 10. The instruction sets and subroutines of IO management process 10, which may be stored on a storage device (e.g., storage device 16) coupled to server computer/controller 100, may be executed by one or more processors (not shown) and one or more memory architectures (not shown) included within server computer/controller 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when server computer/controller 100 is configured as an application server, these IO requests may be internally generated within server computer/controller 100. Examples of IO request 20 may include but are not limited to IO write request 116 (i.e. a request that content 118 be written to storage system 12) and IO read request 120 (i.e. a request that content 118 be read from storage system 12).

As discussed above, the instruction sets and subroutines of IO management process 10, which may be stored on storage device 16 included within storage system 12, may be executed by one or more processors (not shown) and one or more memory architectures (not shown) included within storage system 12. Accordingly, in addition to being executed on server computer/controller 100, some or all of the instruction sets and subroutines of IO management process 10 may be executed by one or more processors (not shown) and one or more memory architectures (not shown) included within data array 112.

The IO Management Process:

The various storage targets (e.g. storage targets 102, 104, 106, 108) included within data array 130 may be divided into a plurality of LUNs (i.e., Logical Unit Numbers). As is known in the art, a LUN is a logical storage device that may be "constructed" from various physical portions of a target storage device (e.g. storage targets 102, 104, 106, 108). For the following discussion, IO operations that are being performed on data array 112 may be performed on individual LUNs defined within data array 112.

As discussed above, various IO requests (e.g. IO request 20) may be sent from client applications 22, 24, 26, 28 to storage system 12 and/or (when server computer/controller 100 is configured as an application server) internally generated within server computer/controller 100. IO request 20 may include but are not limited to IO write request 116 and IO read request 120.

Upon IO management process 10 receiving 200 an IO request (e.g., IO request 20) from a host (e.g., server computer/controller 100) concerning an IO operation (e.g., an IO read operation or an IO write operation) to be performed on data array 112, IO management process 10 may process 202 the IO request to generate IO descriptor 122.

One or more IO processing routines (e.g., IO processing routines 124, 126, 128) may process IO request 20 upon it being received 200 by IO management process IO. Examples of such IO processing routines (e.g., IO processing routines 124, 126, 128) may include but are not limited to: a compression/decompression IO processing routine; a deduplication IO processing routine; and a zero detection IO processing routine.

For example, a compression/decompression IO processing routine may process incoming IO requests (e.g., IO request 20) and (if an write request, such as IO write request 116) may compress content 118 prior to content 118 being stored within data array 112. Alternatively, if incoming IO request 20 is a read request (such as IO read request 120), the compression/decompression IO processing routine may decompress content 118 prior to providing content 118 to the requesting host (e.g., server computer/controller 100).

Further, a deduplication IO processing routine may process incoming IO requests (e.g., IO request 20) to determine whether or not content to be written to data array 112 (e.g., content 118) is already stored within data array 112. If content 118 is not already present within data array 112, content 118 may be written to data array 112. Alternatively, if content 118 is already present within data array 112, content 118 may not be written for data array 112 and e.g., an additional pointer may be utilized to correlate two IO write operations to a single piece of content within data array 112.

A zero detection IO processing routine may process incoming IO requests (e.g., IO request 20) to determine whether or not the content associated with the IO request (e.g., content 118) includes a plurality of zeros and is essentially an empty data set.

While the system is described above as including three IO processing routines, this is for illustrative purposes only and is not intended to be a limitation of this disclosure, as other configurations are possible and are considered to be within the scope of this disclosure. For example, the number of IO processing routines may be increased or decreased in accordance with system needs.

When IO management process 10 processes 202 IO request 20 to generate IO descriptor 122, IO management process 10 may extract from IO request 20 pertinent IO information 130 that may be included within IO descriptor 122 in a fashion/format that is usable by the above-described IO processing routines. Examples of pertinent information 130 may include but is not limited to read/write identifiers, flags, pointers to data (e.g., content 118), offsets to locate data, etc.).

When IO management process 10 processes 202 IO request 20 to generate IO descriptor 122, IO management process 10 may define a unique and proprietary memory space for each of a plurality of IO processing routines (e.g., memory space 132 for IO processing routine 124, memory space 134 for IO processing routine 126, and memory space 136 for IO processing routine 128), wherein memory spaces 132, 134, 136 are defined portions of available memory 138. Memory spaces 132, 134, 136 may provide a proprietary memory space for the IO processing routines to utilize when preforming e.g., the above-described operations. Therefore, the above-described IO processing routines may write data to their respective memory spaces without concern for it being overwritten and without the need for e.g., memory locks.

Assume for illustrative purposes that IO management process 10 receives 204 a cancellation request (e.g., cancellation request 140) from the host (e.g., server computer/controller 100) concerning IO request 20. For example, in the event that data array 112 is particularly busy, server computer/controller 100 may issue cancellation request 140 and subsequently issue another IO request concerning the same data.

Upon receiving 204 cancellation request 140, IO management process 10 may broadcast 206 cancellation request 140 to each of the plurality of IO processing routines (in this example, IO processing routines 124, 126, 128). Upon receiving the broadcast cancellation request 140, each of IO processing routines 124, 126, 128 may generate a status report (e.g., reports 142, 144, 146) concerning whether or not the respective IO processing routine is currently processing IO request 20. For example, the status report (e.g., reports 142, 144, 146) may indicate whether or not the respective I/O is currently being processed by e.g., IO processing routines 124, 126, 128.

Accordingly, assume for illustrative purposes that IO processing routine 124 has already processed IO request 20, IO processing routine 126 is currently processing IO request 20, and IO processing routine 128 has not yet processed IO request 20 (as IO processing routines 124, 126, 128 are configured, in this example, to serially process IO request 20. Accordingly and concerning the status report (e.g., reports 142, 144, 146) generated by each of IO processing routines 124, 126, 128, IO processing routing 124 and IO processing routine 128 would issue a status report (e.g., reports 142, 146) that they are not currently processing IO request 20 (as IO processing routine 124 has completed the processing of IO request 20 and IO processing routines 128 has not yet begun processing IO request 20). Further, IO processing routines 126 would issue a status report (e.g., report 144) that it is currently processing IO request 20. Additionally, IO processing routines 124, 126, 128 may each notate in their unique and proprietary memory spaces (e.g., memory space 132 of IO processing routine 124, memory space 134 for IO processing routine 126, and memory space 136 for IO processing routine 128) that if IO request 20 is received, it is not to be processed (thus preventing the inadvertent processing of IO request 20 by IO processing routine 128 (which has not yet begun processing IO request 20)). Further, IO processing routine 126 (which is currently processing IO request 20) may be configured to provide an update to IO management process 10 to report when it has completed processing IO request 20.

IO management process 10 may subsequently receive 208 these status reports (e.g., reports 142, 144, 146) from each of the plurality of IO processing routines (e.g., IO processing routines 124, 126, 128 respectively), wherein each status report identifies (as discussed above) whether or not each of the IO processing routines is currently processing IO request 20. Once such reports are received 208, IO management process 10 will know specifically the status of the propagation of IO request 20 through IO processing routines 124, 126, 128. Accordingly, IO management process 10 may wait for an update (as described above) from IO processing routine 126 concerning the completion of its processing of IO request 20. Once this update is received by IO management process 10, all processing of IO request 20 will be complete and IO management process 10 may release 210 the unique and proprietary memory space (e.g., memory spaces 132, 134, 136) for each of the plurality of IO processing routines (e.g., IO processing routines 124, 126, 128 respectively), thus returning the memory to available memory 138 for use in future IO descriptors.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
   receiving an IO request from a host concerning an IO operation to be performed on a data array;
   processing the IO request to generate an IO descriptor, wherein the IO descriptor defines a unique and proprietary memory space for each of a plurality of IO processing routines;
   receiving a cancellation request from the host concerning the IO request;
   broadcasting the cancellation request to each of the plurality of IO processing routines;
   receiving a status report from each of the plurality of IO processing routines, wherein each status report identifies whether or not each of the IO processing routines processed the IO request; and
   releasing the unique and proprietary memory space for each of the plurality of IO processing routines.

2. The computer-implemented method of claim 1 wherein the IO operation is chosen from the group consisting of:
   a data read operation; and
   a data write operation.

3. The computer-implemented method of claim 1 wherein the IO processing routines include one or more of:
   a compression/decompression IO processing routine;
   a deduplication IO processing routine; and
   a zero detection IO processing routine.

4. A computer program product residing on a non-transitory computer readable medium having a plurality of instructions stored thereon which, when executed by a processor, cause the processor to perform operations comprising:
   receiving an IO request from a host concerning an IO operation to be performed on a data array;
   processing the IO request to generate an IO descriptor, wherein the IO descriptor defines a unique and proprietary memory space for each of a plurality of IO processing routines;
   receiving a cancellation request from the host concerning the IO request;
   broadcasting the cancellation request to each of the plurality of IO processing routines;
   receiving a status report from each of the plurality of IO processing routines, wherein each status report identifies whether or not each of the IO processing routines processed the IO request; and
   releasing the unique and proprietary memory space for each of the plurality of IO processing routines.

5. The computer program product of claim 4 wherein the IO operation is chosen from the group consisting of:
   a data read operation; and
   a data write operation.

6. The computer program product of claim 4 wherein the IO processing routines include one or more of:
   a compression/decompression IO processing routine;
   a deduplication IO processing routine; and
   a zero detection IO processing routine.

7. A computing system including at least one processor and at least one memory architecture coupled with the at least one processor, wherein the computing system is configured to perform operations comprising:

receiving an IO request from a host concerning an IO operation to be performed on a data array;

processing the IO request to generate an IO descriptor, wherein the IO descriptor defines a unique and proprietary memory space for each of a plurality of IO processing routines;

receiving a cancellation request from the host concerning the IO request;

broadcasting the cancellation request to each of the plurality of IO processing routines;

receiving a status report from each of the plurality of IO processing routines, wherein each status report identifies whether or not each of the IO processing routines processed the IO request; and releasing the unique and proprietary memory space for each of the plurality of IO processing routines.

8. The computing system of claim 7 wherein the IO operation is chosen from the group consisting of:

a data read operation; and a data write operation.

9. The computing system of claim 7 wherein the IO processing routines include one or more of:

a compression/decompression IO processing routine;

a deduplication IO processing routine; and a zero detection IO processing routine.

10. The computer-implemented method of claim 1 wherein releasing the unique and proprietary memory space for each of the plurality of IO processing routines includes returning the unique and proprietary memory space to available memory for use in future IO descriptors.

11. The computer program product of claim 4 wherein releasing the unique and proprietary memory space for each of the plurality of IO processing routines includes returning the unique and proprietary memory space to available memory for use in future IO descriptors.

12. The computing system of claim 7 wherein releasing the unique and proprietary memory space for each of the plurality of IO processing routines includes returning the unique and proprietary memory space to available memory for use in future IO descriptors.

\* \* \* \* \*